United States Patent [19]

Vincent De Araujo

[11] Patent Number: 5,099,223
[45] Date of Patent: Mar. 24, 1992

[54] SAFETY DEVICE, IN PARTICULAR A SAFETY GATE, WHICH CAN BE ACTIVATED BY A MOVING BODY

[76] Inventor: Manuel A. Vincent De Araujo, Betton, Bettonet F-73390, Chamoux-sur-Gel, France

[21] Appl. No.: 595,846

[22] Filed: Oct. 11, 1990

[30] Foreign Application Priority Data

Oct. 11, 1989 [FR] France ................... 89 13286

[51] Int. Cl.⁵ .................... G08B 13/00; B61B 11/00; H01H 3/16
[52] U.S. Cl. .................... 340/541; 104/173.2; 200/61.41; 340/665
[58] Field of Search ........ 340/541, 550, 665, 435–437, 340/432.2, 573; 200/61.41; 104/173.2

[56] References Cited

U.S. PATENT DOCUMENTS

| | | | |
|---|---|---|---|
| 3,844,223 | 10/1974 | Brian | 104/173.2 |
| 4,533,799 | 8/1985 | Vincent De Araujo | 200/52 R |
| 4,901,071 | 2/1990 | Fletcher | 340/665 X |
| 4,920,892 | 5/1990 | Pesek | 104/173.2 |

FOREIGN PATENT DOCUMENTS

| | | | |
|---|---|---|---|
| 1461487 | 12/1966 | France | |
| 216398 | 7/1973 | France | |
| 2544125 | 10/1984 | France | |
| 2220512 | 1/1990 | United Kingdom | 340/665 |

Primary Examiner—Edward L. Coles, Sr.
Assistant Examiner—Thomas J. Mullen, Jr.
Attorney, Agent, or Firm—Owen, Wickersham & Erickson

[57] ABSTRACT

Safety device which can be activated, in particular, by a moving body such as a person or an object, in particular a safety gate, comprising a post (2) carrying, at a distance from the ground, a crossbar (4), a first connector for joining the bar to the post and a second connector (3) for joining the post to the ground, at least one of the connectors comprising a holding device (14, 15) capable of releasing the bar when it is subjected to a force caused by the passage or the movement of the said body, and an electrical connection (15) stressed when the bar is released.

20 Claims, 4 Drawing Sheets

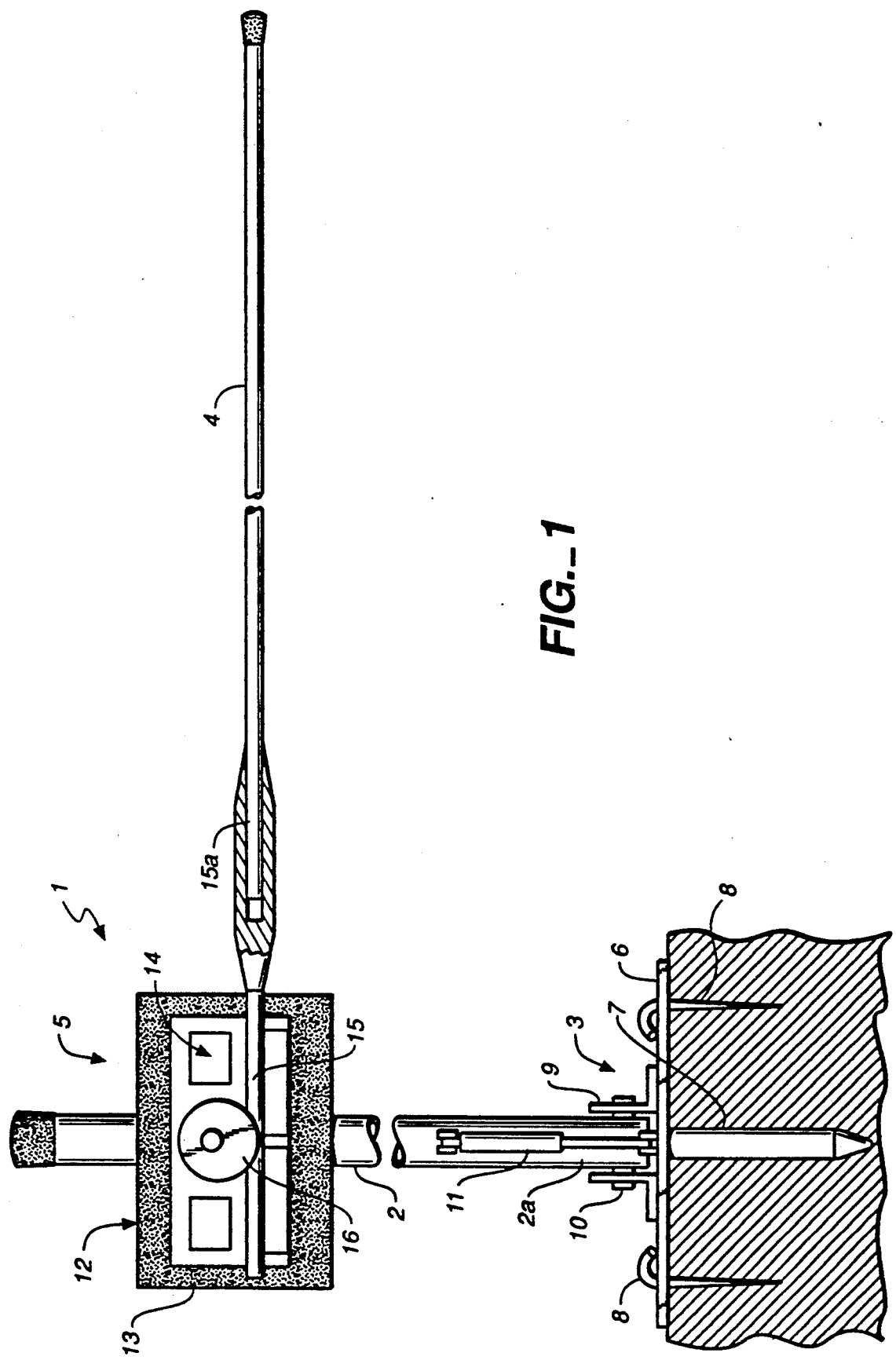
FIG._1

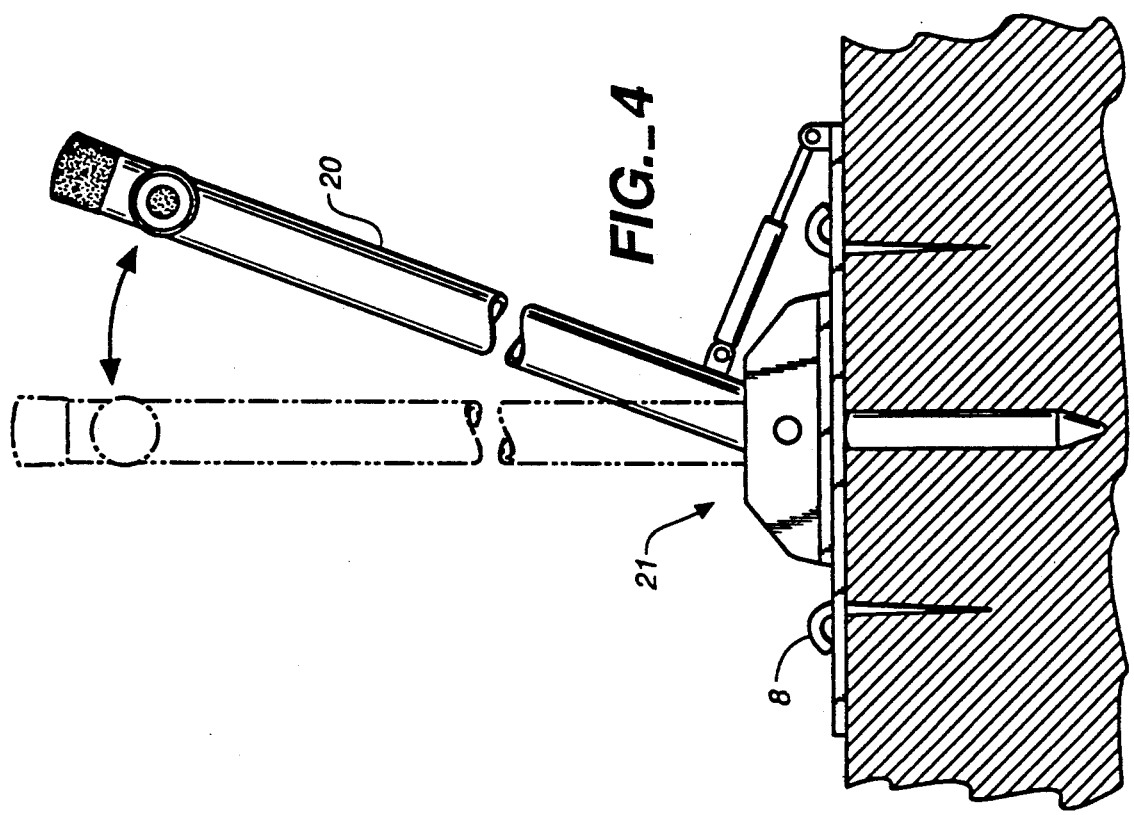
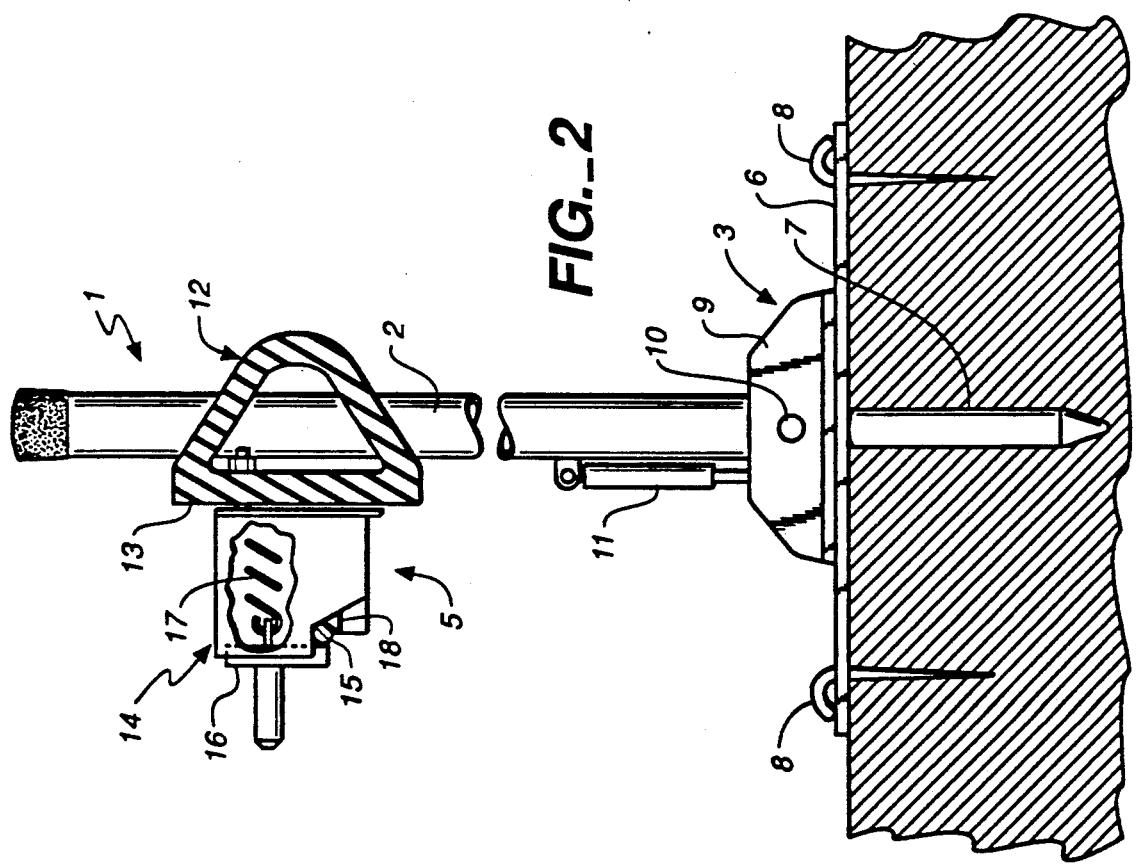

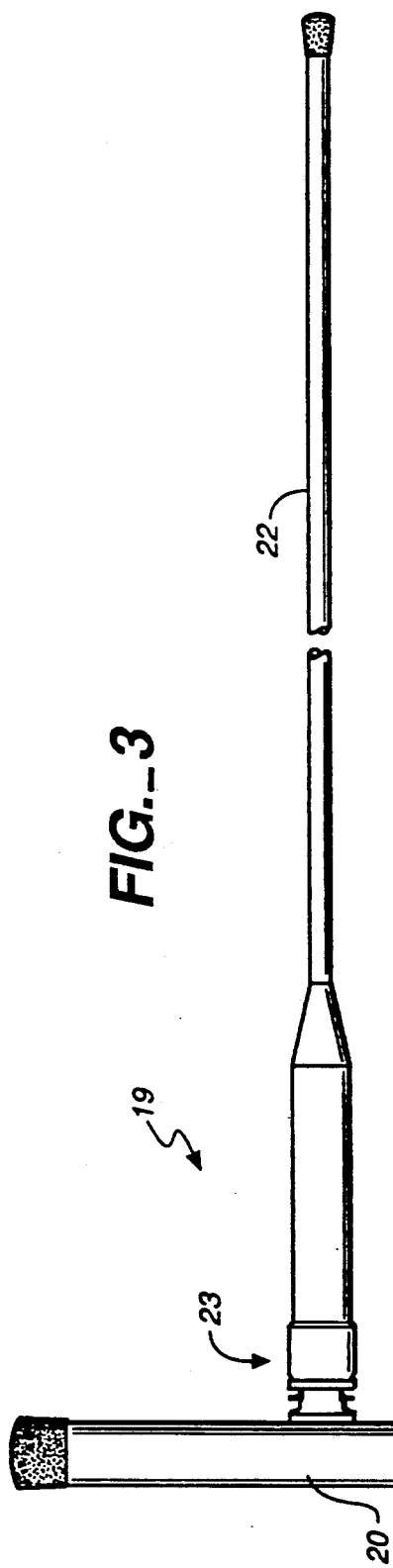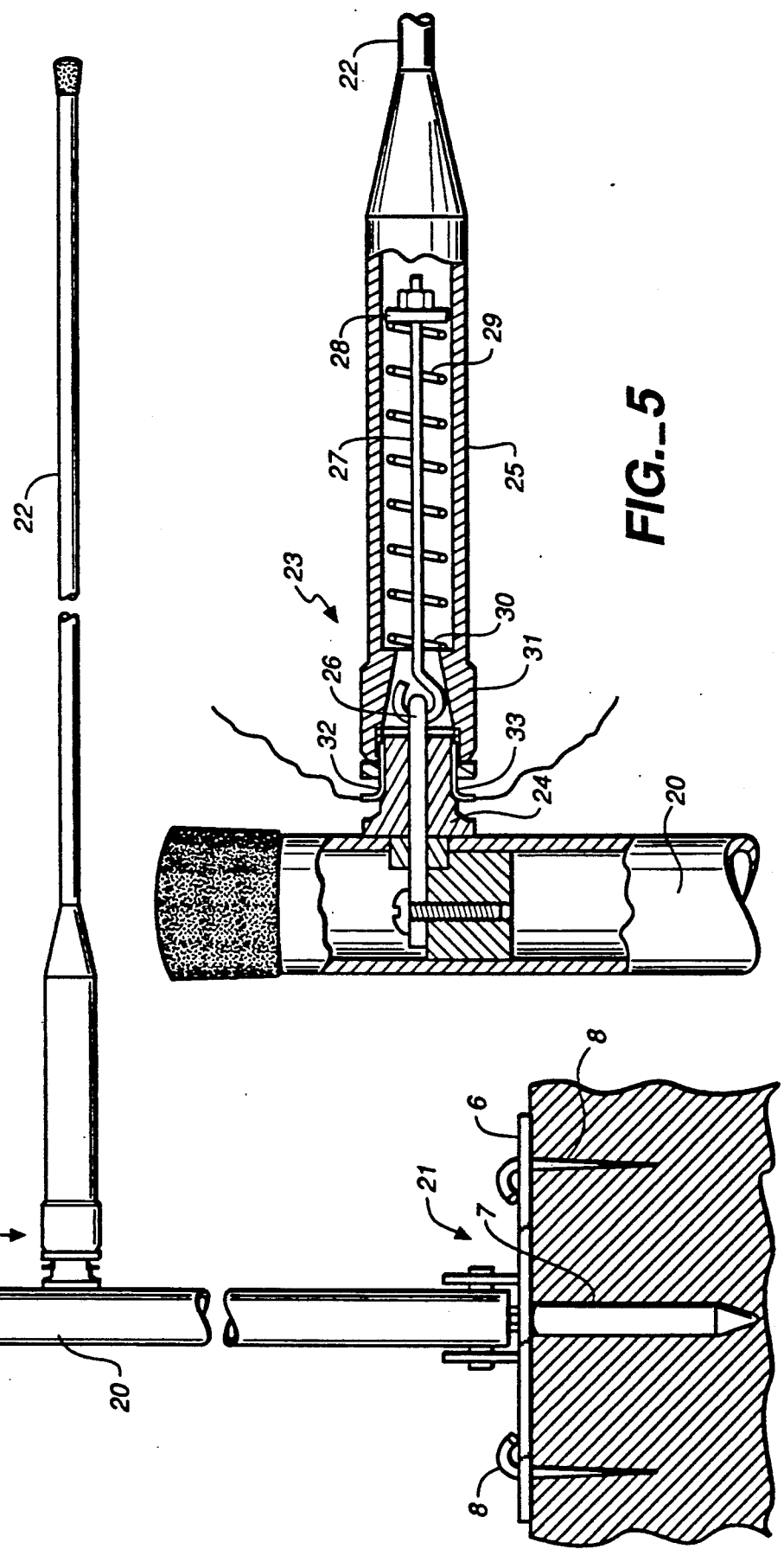

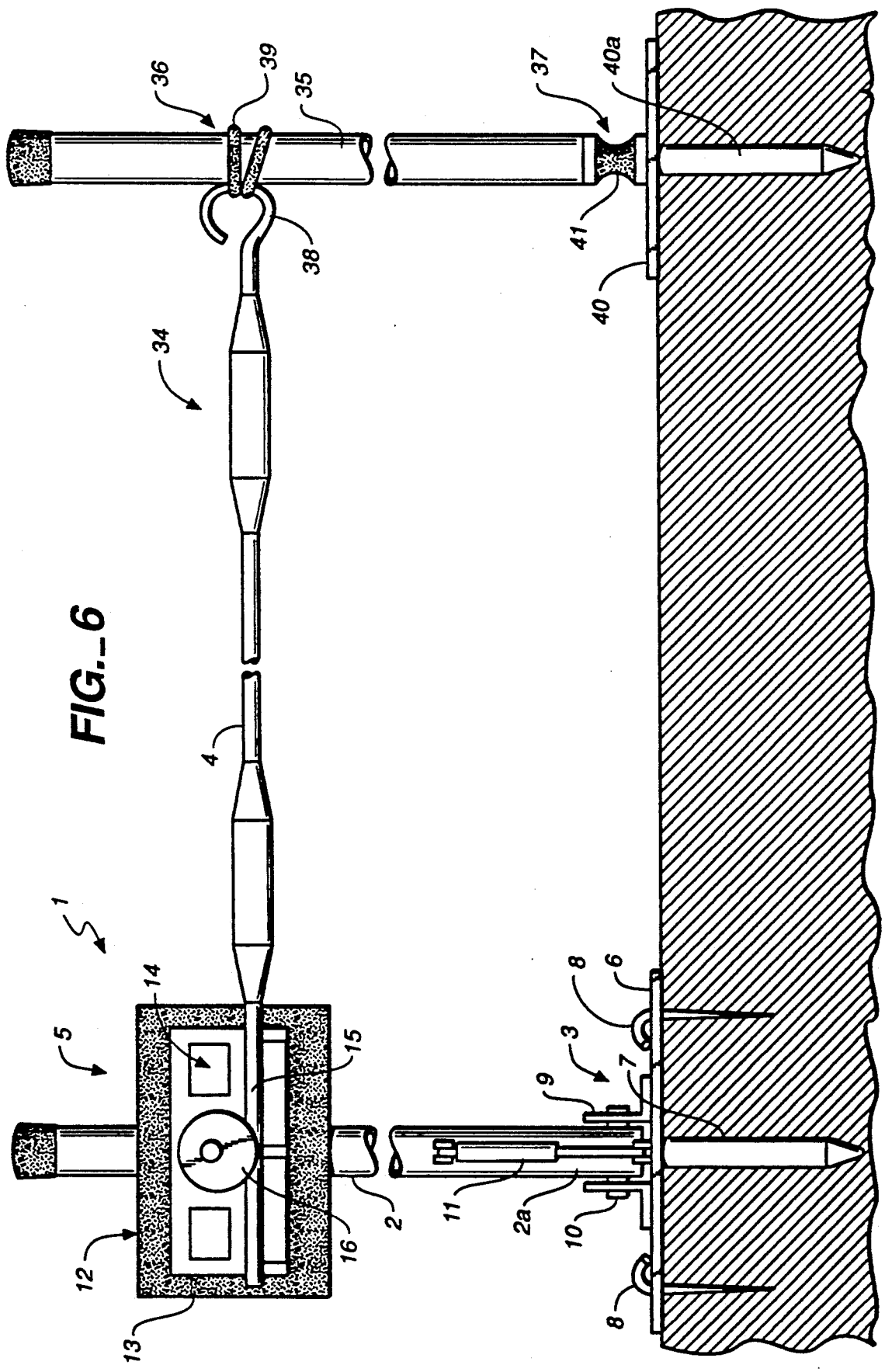
FIG._6

SAFETY DEVICE, IN PARTICULAR A SAFETY GATE, WHICH CAN BE ACTIVATED BY A MOVING BODY

BACKGROUND OF THE INVENTION

The present invention relates to a safety device which can be activated, in particular, by a moving body such as a person or an object, intended in particular to form a safety gate.

In cable installations for transporting people, in particular skiers, safety devices must be provided in order, in the majority of cases, to shut down installation. Such devices are commonly called safety gates, end-of-piste gates, anti-twisting gates or non-alighting gates. Indeed, it is particularly desirable to detect the passage of a user in a place where he should not normally be, to detect on a chairlift a passenger who has not left his chair on the arrival area or a safety bar/footrest unit which has not been raised prior to getting on, or to detect on a ski tow a user who has not released his equipment at the end of the arrival platform, or the extendable part of towing equipment which has not resumed its upper position after having been released by a user on the arrival platform.

Various devices have already been proposed in order to overcome these safety problems.

A safety device is known, in particular, which comprises a post anchored vertically in the ground and on which is mounted a rigid rotary bar which activates an electric switch controlling the shutdown of the installation when it is stressed in rotation. However, this known safety device has disadvantages. These are that if the action exerted on the bar has a direction different from that capable of causing it to rotate, the electric switch will not be activated and the bar consequently forms an obstacle for the skier. Depending on the thickness of the snow, the position of the bar must be adjusted frequently so as to maintain a given height between this bar and the upper surface of the snow. Since the post is anchored in the ground, it must be of sufficient height and resist the pressure resulting from the sliding of the snow blanket on the slope. The post constitutes a danger for the skier who runs the risk of impaling himself on it. Furthermore, the permanent presence of the post complicates the work of making the arrival areas, in particular in the event of a large snowfall or when using mechanized machines.

Another known safety device consists of a wire held taut between two supports. This wire may consist of an electrical conductor capable of being pulled out when the user passes through it, or alternatively of a cord connected to the control member of an electric switch, as described in the Patent FR-A-2,163,987. The main disadvantage of this known safety device lies in the fact that the wire can become wound around the skier or around the towing equipment and is thus likely to hold him or it back dangerously, the shutting down of the installation never being instantaneous.

The object of the present invention is to overcome the disadvantages of the known safety devices and it provides a safety device permitting, in particular, the prevention of any injury to people or any damage to the machinery which could be caused by the safety device itself, whatever the circumstances.

The safety device of the invention can advantageously be used in the field of installations for transporting skiers but can, of course, be used in any fields where the passage of people or objects is to be detected.

SUMMARY OF THE INVENTION

The safety device according to the invention, which can be activated, in particular, by a moving body such as a person or an object, forming in particular a safety gate, comprises a post carrying, at a distance from the ground, a crossbar, means for joining the bar to the post, and means for joining the post to the ground. The said means for joining the bar to the post preferably comprise holding means capable of releasing the bar when it is subjected to a force caused by the passage or the movement of the said body, and electrical connection means stressed when the bar is released, and the said post or its means for joining it to the ground are such that this post can be folded down.

According to the invention, the means for joining the bar to the post are preferably provided with the said holding means which can be released from the said electrical connection means.

In a preferred alternative of the invention, the said means for joining the bar to the post comprise a releasable member on which is fastened the bar and a retention member fastened to the post and holding the releasable member under the influence of an elastic means.

According to the invention, the said electrical connection means can advantageously be arranged between the said releasable member and the said retention member.

According to an embodiment of the invention, the said releasable member consists of an electrically conductive bar, the said retention member comprising electrical contacts against which this conductive bar bears when it is coupled to this retention member.

In another embodiment, the said releasable member comprises a sleeve and the said retention member comprises a projecting part engaged the releasable sleeve and held coupled in by way of a spring. In this case, the said electrical connection means preferably comprise a conductive ring mounted in the said sleeve and insulated electrical contacts mounted on the said projecting part and in contact with this ring when the sleeve and the projecting part are coupled together.

According to the invention, the said means for joining the post to the ground can advantageously comprise an articulation with an axis substantially parallel to the crossbar such that the post can be folded down.

In a particular embodiment, the safety device according to the invention can advantageously comprise a second post carrying the said crossbar at a distance from the abovementioned post, and means for fastening the bar to this second post and means for fastening this second post to the ground.

According to the invention, the said means for fastening the second post to the crossbar and/or to the ground preferably comprise a flexible, and preferably nondetachable, attachment.

In a particular arrangement, the post carrying the crossbar is inclined forwards.

According to the invention, the lower end of the post is preferably mounted on a plate placed on the ground and fastened to the latter by quick-fastening means such as spikes.

According to the invention, the said crossbar is, in a preferred embodiment, flexible.

BRIEF DESCRIPTION OF THE DRAWING

The present invention will be better understood upon studying safety devices which can be activated by a skier in movement and which are described by way of nonlimiting examples and illustrated in the drawing, in which:

FIG. 1 shows a front view in elevation of a first safety device according to the invention;

FIG. 2 shows a side view in elevation of the safety device in FIG. 1;

FIG. 3 shows a front view in elevation of a second safety device according to the present invention;

FIG. 4 shows a side view in elevation of the safety device shown in FIG. 3;

FIG. 5 shows an enlarged view in cross-section of the functional part of the safety device shown in FIG. 3; and FIG. 6 shows a front view in elevation of a third safety device according to the present invention.

DETAILED DESCRIPTION OF EMBODIMENT

Referring to FIGS. 1 and 2, it can be seen that a first safety device has been shown designated in a general manner by the reference 1, which comprises a vertical post 2, the lower part of which is connected to the ground by way of joining means designated in a general manner by the reference 3, and a flexible crossbar 4 mounted cantilevered on the post 2 by joining means designated in a general manner by the reference 5, this bar 4 extending horizontally at a distance from the ground.

The means 3 for joining the post 2 to the ground comprise a plate 6 resting on the ground. This plate 6 carries a central spike 7 driven into the ground and is provided at its periphery with passages in which are engaged removable spikes 8 also driven into the ground, such that the plate 6 is anchored to the ground in a removable manner and cannot rotate.

On its upper face, the plate 6 carries a yoke 9. The lower end 2a of the post is mounted articulated in this yoke 9 by way of a transverse pin 10 such that the post 2 is articulated only in a plane which extends perpendicularly to the crossbar 4. A spring 11, for example of the gas spring type, mounted between the post 2 and the plate 6, enables this post to be held vertical whilst at the same time permitting it to tilt forwards.

The joining means 5 comprise a rubber support block 12 which is carried by the post 2 and immobilized on the latter both vertically and in rotation. On the front transverse face 13 of this support block 12 is fixed a member 14 for retaining a releasable member consisting of a small crossbar 15 which has at one of its ends an axial recess 15a in which one end of the crossbar 4 is mounted, the small bar being at the front of the retention member 14.

In this example, the retention member 14 consists of a device equivalent to the device described in French Patent No. 2,544,125 of the Applicant. As can be seen in particular in FIG. 2, the retention member 14 comprises a front washer 16 subjected to the action of a spring 17 and holding the small crossbar 15 such that if this small crossbar 15 is subjected to a force whose value is greater than a given value, irrespective of the direction of this force, the small crossbar 15 is released.

Furthermore, the small crossbar 15 is electrically conductive and the retention member 14 has two electrical contacts 18 in contact with this small bar 15 such that when the latter is released, the electric current no longer passes between the electrical contacts 18.

The safety device shown in FIGS. 1 and 2 and described hereinabove can be used and functions in the following way.

If it is desired to detect the passage of a person at a given point, for example beyond the arrival area of a ski tow or a chairlift, the safety device 1 is installed such that the flexible bar 4 extends transversely to the passage to be monitored. In order to do this, the plate 6 carrying the post 2 is installed on the snow, driving the spike 7 into the snow, as well as the auxiliary spikes 8, in a position such that the post can tilt forwards in the direction of the movement of the skier in the monitored passage and the height relative to the ground of the crossbar 4 is optionally adjusted by adjusting the position of the rubber block 13 along the post 2.

If a skier enters into or falls in the monitored passage, he strikes the crossbar 4. The latter bends and causes the small bar 15 to be released from the retention member 14, the crossbar 4 and the small bar 15 which it carries generally being detached forwards under the influence of the flexibility of the bar 4. It is possible that the post 2 also tilts forwards but in all cases the small bar 15 is released irrespective of the direction of the force to which it is subjected. Furthermore, if the skier strikes the post 2, the latter folds down forwards.

Once the small bar 15 has been released, the current no longer flows between the electrical contacts 18 and this electrical information is transmitted as control information in order, for example, to cause the installation transporting the skier to be shut down.

The safety device 1 avoids all risks of the skier being injured. Indeed, by virtue of the flexibility of the crossbar 4, the skier does not receive any shock. Since the crossbar 4 is released irrespective of the direction of the movement of the skier, it detaches rapidly, being thrown clear. Since the post 2 can be folded down, there is no risk of it injuring the skier. In the case where the post is flexible or elastically deformable, the result would be the same.

The safety device 1 also has the advantage of being able to be rearmed immediately. Indeed, the bar 4 need only be recovered, the small bar 15 recoupled to the retention member 4 and the post 2, if necessary, returned to the vertical.

Furthermore, since the safety device 1 is simply placed by way of the plate 6 on the snow and fastened solely by way of the spikes 7 and 8, its installation and disassembly are simple and quick. It is consequently possible to change its position, remove it when carrying out work on the stations or when a snowfall is in prospect, or remove it or at night in order to re-install it later on the snow.

Referring now to FIGS. 3 to 5, a second safety device, designated in a general manner by the reference 19, will be described. This safety device 19 comprises a post 20 which is fastened to the ground via joining means designated in a general manner by the reference 21 and whose structure is identical to that of the above-described joining means 3 of the safety device 1. In this example, however, the post 20 is not immobilized vertically, in a releasable manner, but is inclined forwardly as can be seen in FIG. 4.

The safety device 19 comprises, as before, a flexible crossbar 22 mounted cantilevered on the post 20 via joining means designated in a general manner by the reference 23.

As can be seen in more detail in FIG. 5, the joining means 23 comprise a retention member consisting of a projecting part 24, of cylindrical cross-section, which is fastened laterally onto the post 20 and which extends transversely, and a releasable member consisting of a sleeve 25, one end of which is engaged on the projecting part 24 and the other end of which carries, in alignment, one of the ends of the flexible crossbar 22. The projecting part 24 carries at its centre a foot 26 on which is mounted in an articulated manner a tension rod 27 which runs in the sleeve 26 and whose other end is provided with a washer 28, a spring 29 being arranged between this washer 28 and a shoulder 30 of the sleeve 25, situated on the side of the projecting part 24.

The sleeve 25 is thus held coupled to the projecting part 24 via the spring 29 but can be uncoupled from it by pivoting in any direction if, to repeat the above example, a skier displaces the flexible crossbar 22.

Whereas the small bar 15 was separable in the above example, in this example the sleeve 25 remains joined to the projecting part 24 by the tension rod 27 and after activation the sleeve 25 need only be replaced transversely and engaged on the projecting part 24 in order to return the safety device 19 to its initial position. In an alternative, the force of the spring 29 can be sufficient to return the crossbar 22 to its initial position coupled to the post 20 when the action on this bar ceases.

It can be seen, furthermore, in FIG. 5, that the sleeve 25 carries a conductive bush 31 which surrounds the end of the projecting part 24 and that the latter carries two electrical contacts 32 and 33 which are in contact with the bush 31 when the sleeve 25 is coupled to the projecting part 24. When the sleeve 25 is released or uncoupled from the projecting part 24, the electrical connection between the contacts 32 and 33 via the bush 31 is interrupted, this interruption constituting control information as in the above example.

The safety device 19 which has just been described has the same use and functional advantages as the above-described safety device 1.

Referring to FIG. 6, it can be seen that a third safety device has been shown, designated in a general manner by the reference 34, which constitutes an extension of the safety device 1 described above with reference to FIGS. 1 and 2.

Indeed, this safety device 34 comprises the safety device 1 and differs from it by the fact that the end of the flexible crossbar 4, which was free beforehand, is now connected to a second post 35 via joining means designated in a general manner by the reference 36, this post 35 being connected to the ground via joining means designated in a general manner by the reference 37.

The joining means 35 consist of a flexible attachment which comprises, in this example, a ring 38 fastened to the end of the crossbar 4, opposite the small bar 15, and a cord 39, for example elastic, which surrounds the post 35 and which holds the ring 38.

The joining means 37 comprise a plate 40 placed on the ground and provided with a spike 40a which is driven into the ground, for example into the snow, and a block 41 made from an elastic material, for example from rubber, which is mounted on the upper face of the plate 40 and on which the lower end of the post 35 is fastened.

The provision of a second post 35 combined with the safety device 1 does not alter the use and functioning of the latter. The crossbar 4 is simply not detachable from the post 35 which is itself not detachable from the ground such that the flexibility effect of this above-described bar is increased. Furthermore, given the fact that the attachments 38, 39 and 41 are flexible in all directions, the second post 35 presents no danger for the skier and it is certain that the small bar 15 will detach if the flexible bar 4 is stressed at any point whatsoever of its length.

In addition, the provision of a second post 35 to carry the flexible crossbar 4 enables a much longer bar to be used than that which it is possible to use in the alternative of FIG. 1.

The present invention is not, of course, limited to the structural, functional and use examples described hereinabove with reference to the drawings.

Indeed, joining means of a different structure could have been described, and crossbars extending on either side of the post or posts which carry them could have been provided. The various embodiments proposed could also have been combined in a different manner.

As for the uses of the safety device of the invention, they are, of course, not limited to the monitoring of dangerous passages for a skier. The safety device can also be used each time that detection of the passage of a body, object or apparatus is desired.

I claim:

1. A safety device such as a safety gate which can be activated by a moving body such as a person or an object, said device comprising:
   a post (2) carrying, at a distance from the ground, a crossbar (4),
   means (5) for joining the bar to the post, and means (3) for joining the post to the ground,
   the said means (5) for joining the bar to the post comprising holding means capable of releasing the bar when it is subjected to a force caused by the passage or the movement of the said body, and electrical connection means (15, 18) for providing a signal when the bar is released,
   said post or its means (3) for joining it to the ground being such that this post can be folded down.

2. Safety device according to claim 1, characterized in that the means (5) for joining the bar to the post are provided with the said holding means which can be released from the said electrical connection means.

3. Safety device according to claim 2, characterized in that the said means for joining the bar to the post comprise a releasable member (15) on which is fastened the bar (4) and a retention member (14) fastened to the post and holding the releasable member (15) under the influence of an elastic means (7).

4. Safety device according to claim 3, characterized in that the said electrical connection means (15, 18) are arranged between the said releasable member and the said retention member.

5. Safety device according to claim 4, characterized in that the said releasable member consists of an electrically conductive small bar (15), the said retention member (14) comprising electrical contacts (18) against which this small conductive bar bears when it is coupled to this retention member.

6. Safety device according to claim 3, characterized in that the said releasable member consists of an electrically conductive small bar (15), the said retention member (14) comprising electrical contacts (18) against which this small conductive bar bears when it is coupled to this retention member.

7. Safety device according to claim 1, characterized in that the said means for joining the bar to the post comprise a releasable member (15) on which is fastened the bar (4) and a retention member (14) fastened to the post and holding the releasable member (15) under the influence of an elastic means (7).

8. Safety device according to claim 7, characterized in that the said electrical connection means (15, 18) are arranged between the said releasable member and the said retention member.

9. Safety device according to claim 8, characterized in that the said releasable member consists of an electrically conductive small bar (15), the said retention member (14) comprising electrical contacts (18) against which this small conductive bar bears when it is coupled to this retention member.

10. Safety device according to claim 7, characterized in that the said releasable member consists of an electrically conductive small bar (15), the said retention member (14) comprising electrical contacts (18) against which this small conductive bar bears when it is coupled to this retention member.

11. Safety device according to claim 7, characterized in that the said releasable member comprises a sleeve (25) and that the said retention member comprises a projecting part (24) engaged in the sleeve, this projecting part and this sleeve being held coupled together by way of a spring (29).

12. Safety device according to claim 11, characterized in that the said electrical connection means comprise a conductive ring (31) mounted in the said sleeve (25) and insulated electrical contacts (32, 33) mounted on the said projecting part and in contact with this ring when the sleeve and the projecting part are coupled together.

13. Safety device according to claim 1, characterized in that the means for joining the post to the ground comprise an articulation (10) with an axis substantially parallel to the crossbar (4) such that the post can be folded down.

14. Safety device according to claim 1, characterized in that it comprises a second post (35) carrying the said crossbar (4) at a distance from the abovementioned post (2), and means (36) for fastening the bar to this second post and means (37) for fastening this second post to the ground.

15. Safety device according to claim 14, characterized in that the said means for fastening the second post to the crossbar and/or to the ground comprise a flexible, and non-detachable, attachment (38, 39, 41).

16. Safety device according to claim 1, characterized in that the post (20) is inclined.

17. Safety device according to claim 1, characterized in that the lower end of the post is mounted on a plate (6) placed on the ground and fastened to the latter by quick-fastening means such as spikes (7, 8).

18. Device according to claim 1, characterized in that the said crossbar (4) is flexible.

19. Device according to claim 1, characterized in that the said means for joining the said post to the ground are articulated such that said post can be folded down.

20. Device according to claim 1, characterized in that the said post is elastically deformable such that it can be folded down.

* * * * *